April 6, 1965 P. B. ZEIGLER 3,176,537
STEERING MECHANISM
Filed Sept. 14, 1961 4 Sheets-Sheet 1

INVENTOR.
Philip B. Zeigler
BY
Bryce Beecker
ATTORNEY

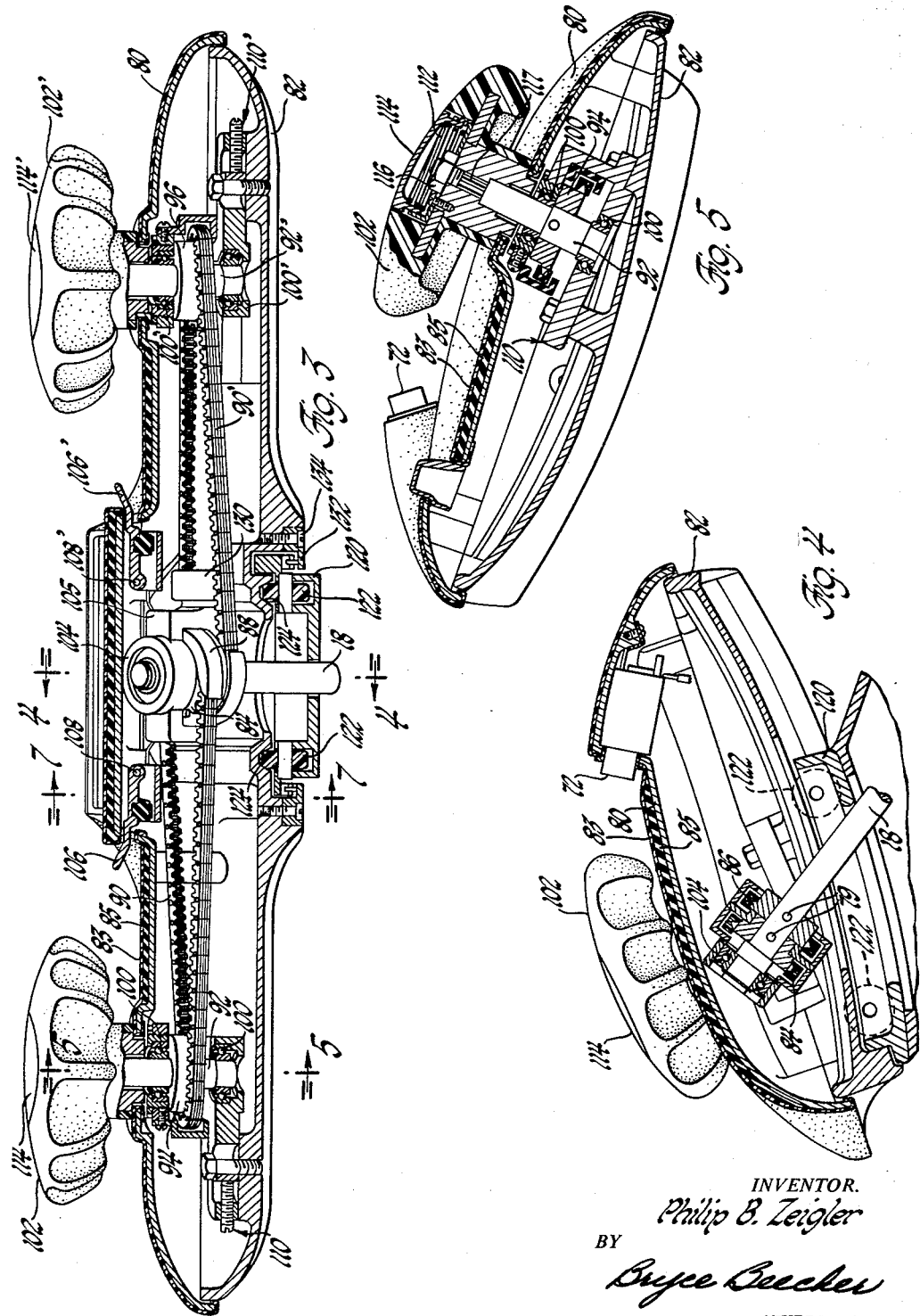

April 6, 1965  P. B. ZEIGLER  3,176,537
STEERING MECHANISM
Filed Sept. 14, 1961  4 Sheets-Sheet 3

INVENTOR.
Philip B. Zeigler
BY
Bryce Beecher
ATTORNEY

April 6, 1965 P. B. ZEIGLER 3,176,537
STEERING MECHANISM
Filed Sept. 14, 1961 4 Sheets-Sheet 4
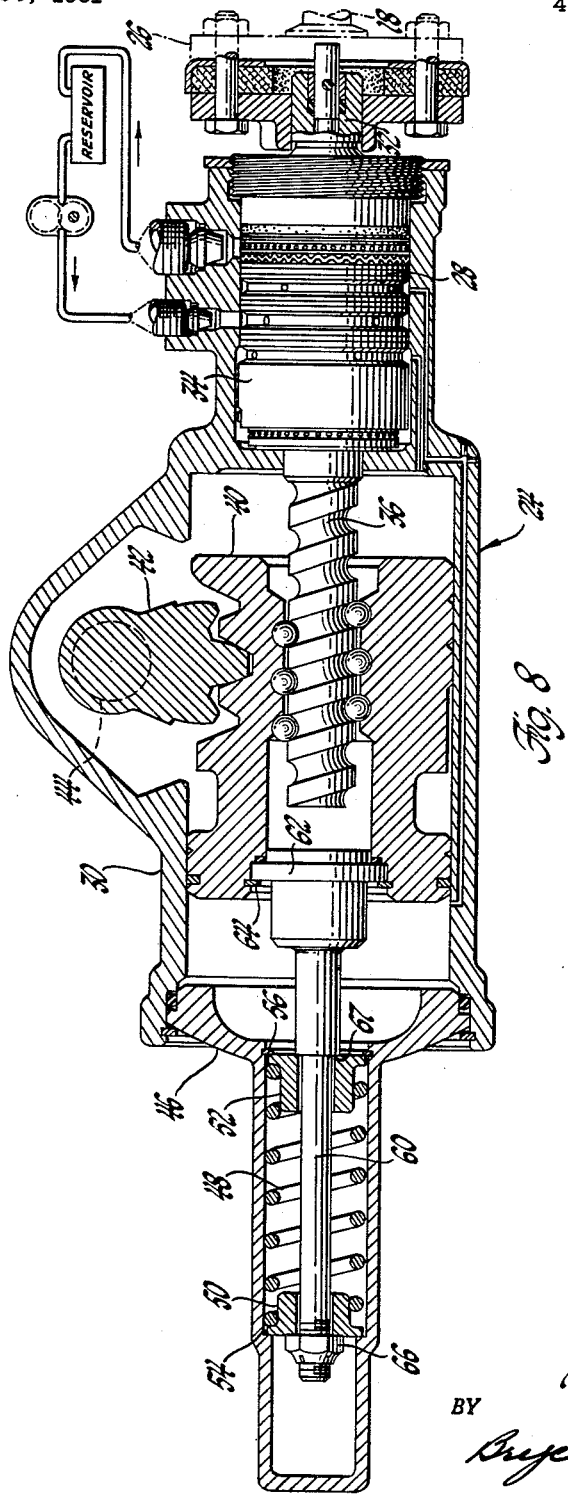
INVENTOR.
Philip B. Zeigler
BY
Bryce Beecher
ATTORNEY United States Patent Office 3,176,537
Patented Apr. 6, 1965

3,176,537
STEERING MECHANISM
Philip B. Zeigler, Saginaw, Mich., assignor to General Motors Corporation, Detroit, Mich., a corporation of Delaware
Filed Sept. 14, 1961, Ser. No. 138,136
9 Claims. (Cl. 74—492)

This invention concerns a steering control system which dispenses with the conventional steering wheel.

Excepting the tiller bar employed in the early days, automotive vehicles have always been steered by means of a wheel carried on a supporting column and operably connected to the dirigible wheels through reduction gearing and a steering linkage. The use of a steering wheel has continued through the years despite the revolutionary advances in other areas, e.g., automatic transmissions, high torque engines, etc. This retention of the steering wheel is undoubtedly due, in major part at least, to the following factors:

(a) Operators have grown accustomed to the steering wheel, and out of safety considerations manufacturers have hesitated to adopt some other instrumentality;

(b) The steering wheel provides leverage additional to that provided by the steering gear and to employ means not affording such additional leverage would necessitate an increase in the steering ratio, considered by many already too high;

(c) The steering wheel has a significant flywheel effect exercised on reversal, i.e., return to center, of the steering parts following negotiation of a turn.

As to vehicles equipped with power steering apparatus, reason (b) supra, of course, loses force, but reasons (a) and (c), and particularly (a), still obtain. Accordingly, the operator of the power steered vehicle, like the operator of a purely manually steered vehicle, is called upon to impose his control through a steering wheel. This means that the steering operation still involves suffering the obstacle to good visibility presented by the upper portion of the steering wheel and the fatigue resulting from the necessary use in the steering operation of the arm and shoulder muscles. While this fatigue is less, to be sure, with power steering than with pure manual steering, it is nevertheless substantial, particularly on a long trip as any driver will attest.

By the present invention there is provided a steering system fully answering to the objections encountered with the steering wheel, but which does not involve continuing hazards, such as difficult driver adaptation, which might otherwise obtain upon elimination of the steering wheel. In a preferred form, this invention provides a console device of such a configuration and which is so mounted within the vehicle body as to provide a rest or support for the arms and hands of the vehicle operator and present no obstruction to visibility, with manually manipulable steering means or knobs being mounted on the console and operably connected to the vehicle steering mechanism, the knobs being manipulable under operator finger action while the operator's arms and hands are at rest on the console. Preferably, the console is adjustable fore-and-aft to suit the needs of an individual operator, and preferably, the console mounts other instruments of vehicle control unrelated to the steering function.

One object of this invention is to provide a steering system including steering means, the use of which does not involve exercise of the arm and shoulder muscles.

Another object is to provide a steering instrumentality which presents no impediment to visibility or to entering or leaving the vehicle.

Still another object is to provide a steering system affording the indicated advantages which is of such design that the average operator can readily adapt himself to it.

Other objects and features of the invention will be apparent from the following description and the accompanying drawings addressed to a preferred embodiment.

In the drawings:

FIGURE 3 is a section on the line 3—3 in FIGURE 2;

FIGURE 4 is a section on the line 4—4 in FIGURE 3;

FIGURE 5 is a section on the line 5—5 in FIGURE 3;

FIGURE 8 is a lonigtudinal section of the power steering gear preferred for use in the system.

Figure 1:
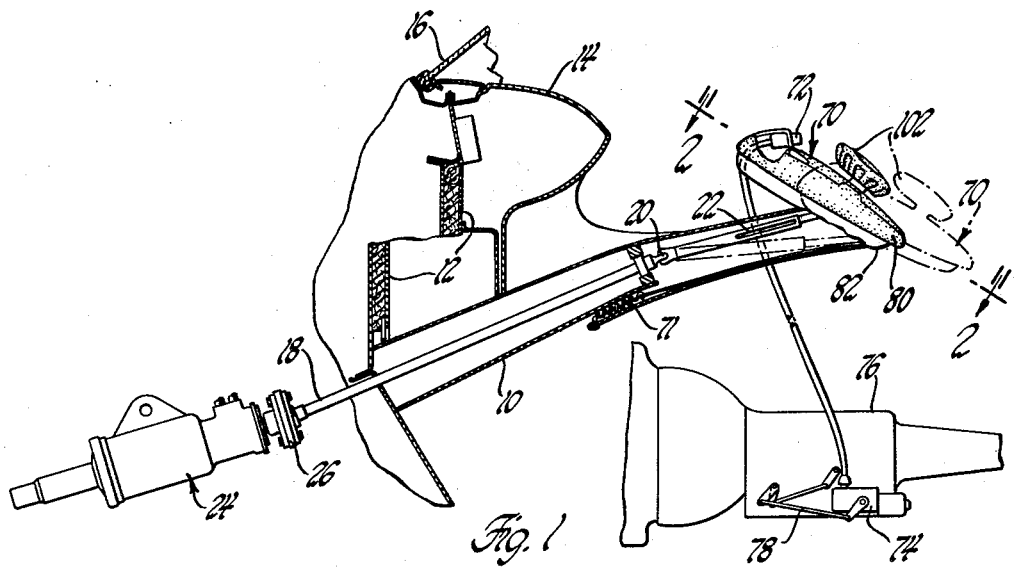
FIGURE 1 shows the system in side elevation, certain parts appearing in section or broken away.
Figure 2:
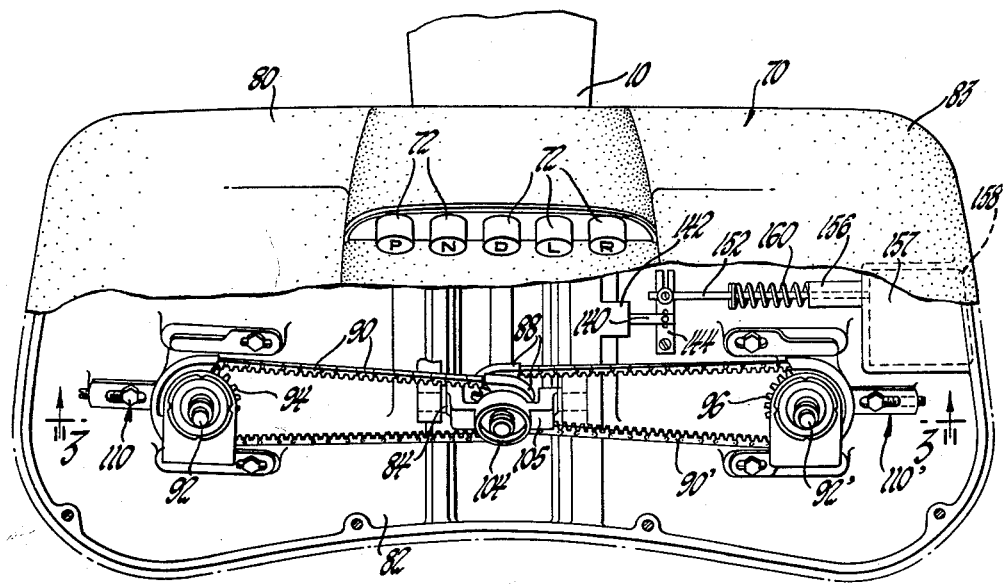
FIGURE 2 is a view on the line 2—2 in FIGURE 1, with a housing panel being shown broken away.

Referring first to FIGURE 1, the numeral 10 denotes a steering column terminating at an insulated fire wall 12, separating the engine and driver's compartments. The upper portion of the fire wall mounts a cowling 14 and a windshield 16 extends upwardly and rearwardly of the front edge of the cowling.

Column 10 is formed with a bend for a purpose which will later appear. Within such column is a steering shaft 18 U-jointed at 20 and comprising a lost motion connection 22. At its lower end shaft 18 is connected to a power steering gear 24 through a flexible coupling 26. This coupling, which may be of any suitable design, serves to correct misalignment problems occurring during assembly of the vehicle. Also, it may damp out noise-producing vibrations occasioned by road irregularities. The coupling structure disclosed in U.S. Patent No. 2,753,848 granted to Robert W. Burton July 10, 1956 is exemplary of a suitable coupling.

The power steering gear 24 contemplated for use in the illustrated system is shown in FIG. 8 and comprises a control valve 28 and a fluid motor or power cylinder 30. Valve 28 is fully described in copending application Serial No. 762,153 filed in the names of William B. Thompson and Philip B. Zeigler, which issued on February 27, 1962 as U.S. Letters Patent No. 3,022,772. Suffice it to say here, that such valve comprises an inner sleeve member rotated by the stub shaft 32 and an outer sleeve member 34 connected to the worm 36. When the inner sleeve member is rotated relative to the outer sleeve member a differential pressure within the cylinder 30 results and the piston 40 becomes displaced in one direction or the other as determined by the direction of the relative rotation.

Piston 40 is formed to accommodate the worm 36 and has a ball connection therewith. A gear sector 42 meshing with the rack teeth of the piston is integral with a cross shaft 44, such shaft externally of the cylinder 30 carrying a pitman, not shown, through which the steering linkage of the vehicle is actuated. The end cover 46 of the cylinder 30 is formed to accommodate a spring 48 disposed between seats 50 and 52. Seat 50 abuts a shoulder 54 integral with the cover, while seat 52 abuts a snap ring 56 accommodated in an annular groove in the cover 46. A reach rod 60 is flanged at 62 for the purpose of seating a similar snap ring 64 operating to secure the reach rod to the piston 40. Leftward of the flange 62 the reach rod is provided with a shoulder 67 having abutting engagement with the seat 52. A nut 66 is threaded on the end of the reach rod 60, the inner face of the nut engaging the seat 50 and, with the piston 40 in the position shown, being flush with the shoulder 54.

In the arrangement as illustrated, the spring 48 tends to resist displacement of the piston in either direction and thus tends to maintain the piston, and hence the other steering parts, in centered position.

Reverting now to FIGURES 1 to 5, there will be seen supported by column 10 at the top thereof a console 70. This console carries control switch buttons 72 for a solenoid-actuated automatic transmission and the console is slidable fore and aft, the aft movement being accompanied by the tensioning of a spring 71 attached at its end opposite the consloe to column 10. The transmission solenoid and the associated parts are contained in a casing 74 shown in FIGURE 1 as fixedly secured to the transmission casing 76. The solenoid device is mechanically connected to the controls within the transmission casing 76 via a lever system 78.

The housing portion of the console 70 consists of a top member 80 and a bottom member 82, the top member being provided with a leatherette cover 83 disposed over a layer of cushioning material 85. Within the housing the upper portion of the steering shaft 18 has secured thereto by means of pins 79 (FIG. 4) a pair of sprocket wheels 84 and 86 (FIGS. 2–5) each having associated therewith a retainer 88 for a drive chain. One drive chain 90 interconnects the steering shaft 18 with a stub shaft 92 fixedly mounting sprocket wheel 94 which is complementary to sprocket wheel 84, and another drive chain 90' interconnects the steering shaft 18 with a stub shaft 92' fixedly mounting sprocket wheel 96 which is complementary to sprocket wheel 86. The stub shaft 92 turns in ball bearings 100 and carries a knurled knob 102 externally of the console housing. Similarly, stub shaft 92' turns in ball bearings 100' and carries a knurled knob 102' externally of the console housing.

The bearings 100 and 100' for the respective stub shafts 92 and 92' are supported by the bottom panel 82 of the console housing, respective bearing support means 110 and 110' being adjustable in a lateral direction so that the drive chains may be suitably tensioned.

Steering shaft 18 has an upper bearing 104 within the console housing. This bearing is supported by a trunnion 105 based on the bottom panel 82.

At either side of the bearing 104, as seen in FIGURE 3, is a turn signal switch 106, 106' having the form of a lever, the fulcrums of which are indicated at 108.

Knurled knobs 102, 102' are suitably formed of plastic composition over metal, and as illustrated by FIGURE 5, may be secured to the respective stub shafts 92, 92' by splining 117 with the connections being made fast by nuts 116 threaded on the stub shafts. A spring 112 within each knob 102 is functional with relation to a medallion 114 which may serve as a horn button, the contacts and circuitry for which are not shown.

The previously mentioned fore and aft adjustments of the console 70 facilitates leaving and entering the vehicle and renders the console adaptable to individuals of different girths and trunk heights. Also, the adjustment can be altered at any time with the vehicle in operation to compensate for changes in body position.

Figure 6:
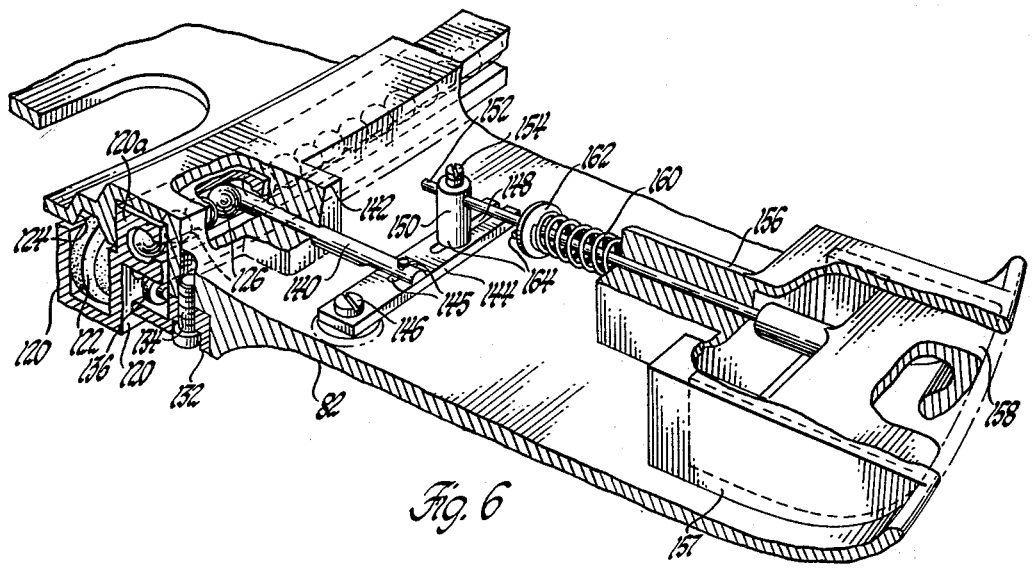
FIGURE 6 is a view in perspective of locking apparatus incorporated in the system.
Figure 7:
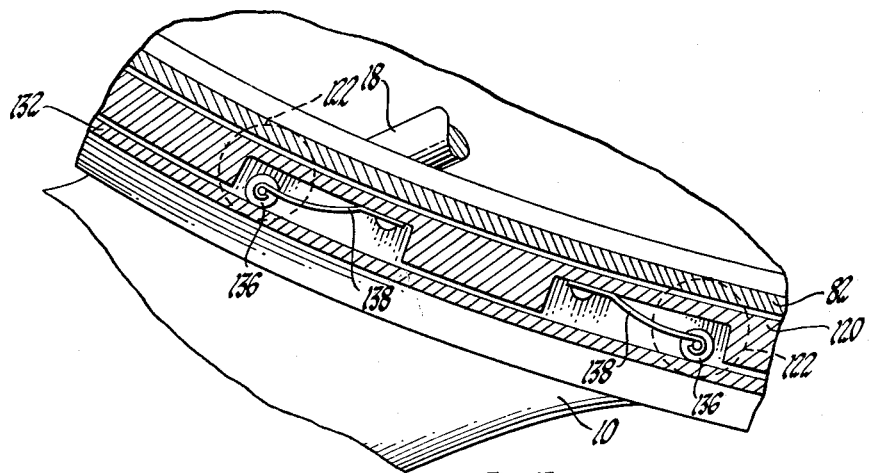
FIGURE 7 is a fragmentary section on the line 7—7 in FGURE 3.

As shown in FIGURES 3 and 4, the steering column 10 at the top thereof has secured thereto as by welding, a carrier 120 for rollers 122, the upper portions of which are accommodated in channels 124 formed in the bottom panel 82 of the console housing. The carrier 120 is located immediately below the trunnion supports 130 for the upper steering shaft bearing 104 and has a portion 120a (FIG. 6) designed to receive a file of balls 126, the purpose of which will be shortly explained. Immediately below the portion 120a is a fixture 132 shown secured to the panel 82 by means of screws 134. Riding on this fixture 132 are auxiliary rollers 136 (FIG. 7) connected to the carrier 120 (more accurately, portion 120a thereof, FIG. 6) through leaf springs 138. The rollers 136 being thus spring loaded act to force the plate 82 and hence the channels 124 downwardly so as to make firm the contact between the rollers 122 and the panel 82.

The balls 126, previously mentioned, represent part of a locking device whereby the console may be retained in a selected position within the limits indicated by the extreme positions illustrated in FIG. 1. A pin element 140 (FIG. 6) will be seen as having its free end disposed between a pair of the balls in the file, thus locking the console in its shown position. This pin is journaled for sliding movement in a boss 142 shown integral with the panel 82 and is axially displaceable through a lever 144 with which the pin has a lost motion connection 145. Lever 144 is pivotally connected to the panel 82 at 146 and at its opposite end has a slot 148 for the accommodation of a stud 150 carried near the end of a reach rod 152. A screw 154 makes adjustable the connection between the stud 150 and the reach rod which extends through a journal boss 156 for connection to a hand grip 158, the journal boss being integral with the housing 157 for the hand grip. A spring 160 disposed between the end of the boss 156 and a spring seat 162 backed by a pin 164 resists outward movement of the reach rod and accordingly tends to maintain the parts in their position shown.

It is believed obvious that with the pin 140 displaced the console is readily shifted to any desired position within the limits aforesaid. Once this position has been attained the operator needs only to release the hand grip (located conveniently at the right edge of the console) the spring 160 acting unaided to lock the console in its new position. Due to the inclination of the console little effort is required on the part of the operator to pull the console rearward despite the resulting tensioning of the spring 71 (FIG. 1) which aids forward movement of the console.

Any movement of the console, of course, proceeds with either lengthening or shortening of the lost motion connection 22 in the steering shaft 18 and a swinging motion of that part of the steering shaft rearward of the U-joint 20.

The steering of the vehicle may be accomplished using either of the knobs 102 or both simultaneously, only hand and finger action being required in either case.

What is claimed is:

1. A vehicle steering system comprising, support means within the body of the vehicle, a console device of broad area providing a rest for the arms and hands of an individual operator, means mounting said console device on said support means in such manner that said console device is stationary with respect to said support means in relation to the steering function, an instrument of vehicle control unrelated to the steering function mounted on said console device, a steering shaft extending to said console device, and manually manipulated steering means mounted on said console device and being manipulable under operator finger action while the operator's arms and hands are at rest on said console device, said steering means being operably connected to said steering shaft.

2. A vehicle steering system comprising, support means within the body of the vehicle, a console device of broad area providing a rest for the arms and hands of an individual operator, means mounting said console device on said support means in such manner that said console device is nonrotatable with respect to said support means in relation to the vehicle steering function, a steering shaft extending to said console device, and manually manipulated steering means rotatably mounted on said console device and being manipulable under operator finger action while the operator's arms and hands are at rest on said console device, said steering means being operably connected to said steering shaft.

3. A vehicle steering system comprising, a steering column within the body of the vehicle, a console device of broad area providing a rest for the arms and hands of an individual operator, means nonrotatably mounting said console device on said steering column, an instrument of vehicle control unrelated to the steering function mounted on said console device, a steering shaft extending through said steering column to said console device, and manually manipulated steering means rotatably mounted on said console device and being manipulable under operator finger action while the operator's arms and hands are at rest on said console device, said steering means being operably connected to said steering shaft.

4. A vehicle steering system comprising, a steering column within the body of the vehicle, a console device of broad area providing a rest for the arms and hands of an individual operator, means mounting said console device on said steering column for slidable movement in a fore and aft direction relative to said vehicle, said console device being stationary with respect to said steering column in relation to the vehicle steering function, a steering shaft extending to said console device, and manually manipulated steering means rotatably mounted on said console device and being manipulable under operator finger action while the operator's arms and hands are at rest on said console device, said steering means being operably connected to said steering shaft.

5. A vehicle steering system comprising, a steering column within the body of the vehicle, a console device of broad area providing a rest for the arms and hands of an individual operator, means mounting said console device on said steering column for slidable movement in a fore and aft direction relative to said vehicle, said console device being stationary with respect to said steering column in relation to the vehicle steering function, locking means for retaining said console in a selected position, an instrument of vehicle control unrelated to the steering function mounted on said console device, a steering shaft extending through said steering column to said console device, and manually manipulated steering means rotatably mounted on said console device and being manipulable under operator finger action while the operator's arms and hands are at rest on said console device, said steering means being operably connected to said steering shaft.

6. Apparatus as claimed in claim 5, wherein said manually manipulated steering means comprises two control knobs arranged on opposite sides of the center of said console device and including chain and sprocket means operably connecting said knobs to said steering shaft.

7. Apparatus as claimed in claim 5, wherein said locking means comprises a rectilinearly arranged file of balls and a pin adapted to seat between adjacent balls.

8. Apparatus as claimed in claim 7, wherein said pin is actuated through a lever having a lost motion connection with the pin and pivoted on the console.

9. Apparatus as claimed in claim 8 wherein said lever is displaced by a spring biased rod having a lost motion connection with the lever and terminating in a hand-grip element supported on said console device.

References Cited by the Examiner
UNITED STATES PATENTS

| | | | |
|---|---|---|---|
| 1,128,713 | 2/15 | Neville | 74—554 |
| 1,557,970 | 10/25 | Borrows et al. | 74—501 X |
| 2,114,359 | 4/38 | Selje | 180—90 |
| 2,222,588 | 11/40 | Williams | 189—26 |
| 2,228,393 | 1/41 | Leaming | 137—139 |
| 2,274,069 | 2/42 | Johnson | 74—557 |
| 2,442,288 | 5/48 | Floria | 74—552 X |
| 2,507,600 | 5/50 | Kaiser et al. | 74—494 |
| 2,716,032 | 8/55 | Barenyi | 74—493 X |
| 2,746,698 | 5/56 | Ross | 74—471 X |
| 2,827,801 | 3/58 | Ingolia | 74—551.1 |
| 2,903,904 | 9/59 | Mackie | 74—493 |
| 2,910,887 | 11/59 | Helms | 74—493 |
| 2,931,244 | 4/60 | Brewer | 74—493 X |
| 2,937,881 | 5/60 | Norrie | 180—89 X |
| 3,032,134 | 5/62 | Banker | 74—493 X |

FOREIGN PATENTS

| | | |
|---|---|---|
| 534,656 | 12/40 | Great Britain. |
| 214,970 | 8/41 | Switzerland. |

BROUGHTON G. DURHAM, *Primary Examiner.*